(No Model.)
G. MILLEN.
NUT LOCK.
No. 589,013. Patented Aug. 31, 1897.
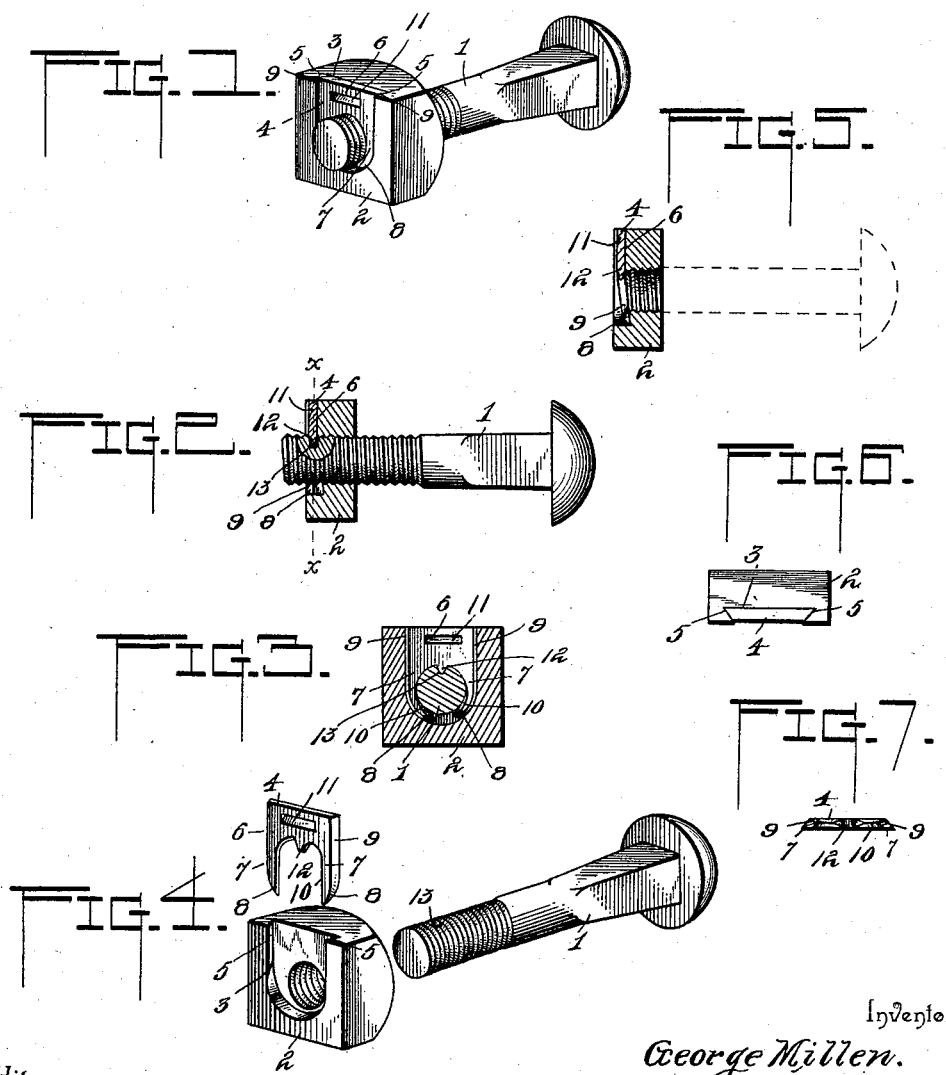

UNITED STATES PATENT OFFICE.

GEORGE MILLEN, OF SAN ANTONIO, TEXAS.

NUT-LOCK.

SPECIFICATION forming part of Letters Patent No. 589,013, dated August 31, 1897.

Application filed December 11, 1896. Serial No. 615,360. (No model.)

*To all whom it may concern:*

Be it known that I, GEORGE MILLEN, a citizen of the United States, residing at San Antonio, in the county of Bexar and State of Texas, have invented a new and useful Nut-Lock, of which the following is a specification.

This invention relates to certain improvements in nut-locks, and has for its object to provide simple means for locking the nut against accidental displacement, at the same time allowing it to be removed by the proper application of force, and, furthermore, to permit the permanent locking of the nut at a predetermined point.

Further objects and advantages of my invention will appear in the accompanying description, and will be more particularly pointed out in the claims.

In the drawings, Figure 1 is a perspective view of a bolt and nut embodying my invention in locked position. Fig. 2 is a longitudinal sectional view of my invention. Fig. 3 is a transverse sectional view thereof, taken on the line $x\ x$, Fig. 1. Fig. 4 is a detail perspective view of the several parts detached. Fig. 5 is a detail sectional view of the nut and locking-key. Fig. 6 is a face view of the same. Fig. 7 is a transverse sectional view of the locking-key.

Corresponding parts in the several figures are denoted by like numerals of reference.

Referring to the drawings, 1 designates an ordinary threaded bolt adapted to receive the nut 2. This nut is provided with a recess 3, extending across one of its faces from one edge to a point just beyond its threaded bore and of sufficient width to embrace said bore and accommodate the locking-key 4. The walls of this recess 3 are beveled outwardly and downwardly, as shown at 5, and at their rear extremities curve around and conform to the bore of the nut.

To lock the nut from accidental displacement, I provide a key 4, of brass or other suitable resilient metal, comprising the body portion 6, provided with the locking fingers or arms 7, curved or pointed at their outer extremities 8. These fingers are oppositely beveled upon their upper edges, as shown at 9, to enter and engage the slot formed by the beveled walls of the nut, and their inner under edges are beveled to form sharp inner edges 10. Upon the upper face of the body portion is provided a transverse slot or depression 11 to facilitate the withdrawal of the key from the nut.

The operation of my invention is as follows: After the nut has been set to its desired position the key is inserted in the recess 3, the fingers 7 entering the groove formed by the beveled walls 5. By hammering upon the driving-head formed by the body portion 6 or otherwise forcing said key the inner sharp edges 10 of the locking-arms are entered between the threads of the bolt and their curved extremities are brought toward each other and forced to tightly clutch or embrace the bolt by action of the curved rear wall of the recess upon said arms, thus effectively locking the nut against accidental displacement. To provide for the slight upward and downward movement, respectively, of the extremities of the locking-arms caused by following the direction of the threads upon the bolt, the rear portion of the recess is somewhat downwardly inclined. By this inclination of the recess the nut may be forcibly unscrewed without damaging the threads of the bolt.

For the permanent locking of the nut I provide a lug or tongue 12 between the fingers of the key, which is adapted to enter a hole or recess 13, provided in the shank of the bolt. It may be found convenient and useful to construct this locking-key, with the driving-head and the lug or tongue 12, of steel or other suitable hard metal and the locking-arms of resilient metal. This construction of key will facilitate its use where no recess has been provided in the shank of the bolt, as the pointed hard-metal lug will forcibly enter the bolt to permanently lock the nut.

By this improved construction and arrangement of parts I have provided convenient and effective means for locking nuts against accidental displacement by the jarring or motion of machinery or from any cause whatever, while at the same time facilitating the removal of the nut when necessary without injury to the threads of either the nut or bolt, and thus permitting the use of the same nut and locking-key a number of times, and, further, the device may be used for the permanent securing of the nut upon the bolt.

However, I do not wish to be understood as limiting myself to the precise construction and arrangement of parts as herein shown and described, as it is obvious that various changes in the form, proportion, and minor details of construction may be made without departing from the principle or sacrificing any of the advantages of my invention.

What I claim is—

1. A nut-lock comprising a nut having a recess in one of its faces, and a key fitting in said recess and having spaced arms to straddle the bolt and be forced by the walls of the recess toward each other and between the threads of the bolt, substantially as described.

2. In a nut-lock, the combination of a nut having a recess provided with a curved inner wall, a key having locking-arms adapted to be turned inward so as to enter between the threads of the bolt and tightly grip the same by the action of the locking-arms against the inner wall of the recess, substantially as shown and described.

3. In a nut-lock, the combination of a nut having a recess provided with a curved inner wall, a key having locking-arms adapted to enter between the threads of the bolt and tightly grip the same by the action of the locking-arms against the inner wall of the recess, and a tongue or lug upon the key, situated between the locking-arms, and adapted to enter a suitable recess in the bolt, substantially as shown and described.

4. A nut-lock, comprising a nut having one of its faces provided with a recess, the bottom of which is inclined downwardly toward its inner closed end, a locking-key fitting in the recess and having locking-arms which are forced to enter between and tightly grip the threads of the bolt, by the action of the arms against the walls of the recess, substantially as shown and described.

In testimony that I claim the foregoing as my own I have hereto affixed my signature in the presence of two witnesses.

GEORGE MILLEN.

Witnesses:
JNO. ROTHMAN,
ALBERT LANG.